April 15, 1930. E. J. BRYANT 1,754,736
SCREW EXTRACTOR
Filed Dec. 28, 1929

Inventor
Elmer J. Bryant
By Attorneys
Southgate Fay & Hawly

Patented Apr. 15, 1930

1,754,736

UNITED STATES PATENT OFFICE

ELMER J. BRYANT, OF GREENFIELD, MASSACHUSETTS, ASSIGNOR TO GREENFIELD TAP & DIE CORPORATION, OF GREENFIELD, MASSACHUSETTS, A CORPORATION OF MASSACHUSETTS

SCREW EXTRACTOR

Application filed December 28, 1929. Serial No. 417,217.

This invention relates to a device for extracting broken or headless screws from threaded holes. It frequently happens that a screw used as a set-screw or a stud used for some similar purpose is twisted off or broken by excessive strain and the removal of such broken pieces commonly presents a more or less serious problem.

It is the object of my invention to provide a screw extractor of an improved construction by which a broken screw or stud may be quickly and easily removed, even when tightly seated.

My invention further relates to arrangements and combinations of parts which will be hereinafter described and more particularly pointed out in the appended claims.

A preferred form of the invention is shown in the drawings, in which—

Figure 1:
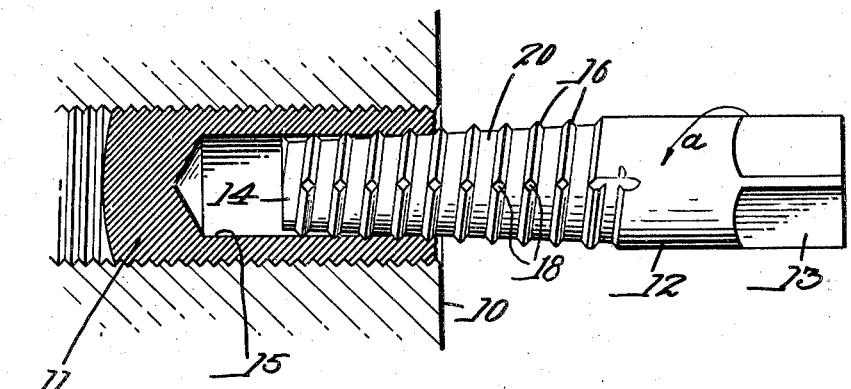
Fig. 1 is a side elevation of my improved screw extractor, the broken screw being indicated in section.

Referring to the drawings, I have indicated a portion of a frame or other metal part 10 having a broken screw 11 threaded therein.

My improved screw extractor comprises a shank portion 12, preferably having a squared end portion 13 to which a wrench may be applied. The extractor is also provided with a threaded tapered portion 14 adapted to enter a hole 15 drilled into the outer end of the screw 11 to be removed.

Figure 2:
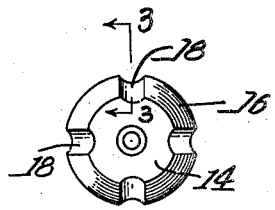
Fig. 2 is an end view of the extractor.

The tapered portion 14 is provided with a screwthread 16 and with longitudinally extending flutes 18 (Fig. 2). The screwthreads 16 are of the opposite hand to the threads of the screw to be extracted. The threads 16 are also of such proportions and pitch or lead that a relatively wide blank surface 20 is provided between each pair of adjacent threads 16. The width of the blank surface 20 is preferably equal to one-half or more of the pitch or lead of the thread 16.

Figure 3:
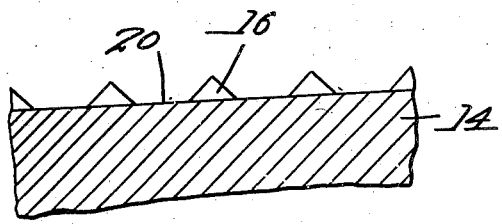
Fig. 3 is a detail sectional view, taken along the line 3—3 in Fig. 2.

The flutes 18 are preferably so cut that the bottoms of the flutes will be substantially in the blank surfaces 14 between the threads 16. The cross section of the threads may be varied within substantial limits, but the threads must be of substantial strength and a thread section having a vertical angle of substantially ninety degrees, as shows in Fig. 3, has been found very satisfactory.

In the use of my improved screw extractor, a hole 15, as previously stated, is drilled in the broken outer end of the screw 11, and the extractor is then inserted in the hole 15 and acts as a tap, cutting a spaced spiral thread in the wall of the hole 15 until the blank surfaces 14 firmly engage the wall of the hole 15. Assuming that the screw has a right hand thread and that the extractor has a left hand thread, as shown in Fig. 1, the extractor will be turned in the direction of the arrow $a$ in Fig. 1 until the resistance of the blank surfaces 14 in the hole 15 exceeds the resistance of the screw 11 in the threaded member 10. Continued rotation of the extractor in the direction of the arrow $a$ will then loosen the screw 11 and cause it to be removed from the hole in which it is seated.

The provision of the relatively wide blank surfaces 20 between the threads 16 is of great importance, as the blank surfaces, when firmly engaging the wall of the hole 15, take the greater part of the strain, which might otherwise cause the threads 16 to be stripped in the hole 15.

Having thus described my invention and the advantages thereof, I do not wish to be limited to the details herein disclosed, otherwise than as set forth in the claims, but what I claim is:—

1. A screw extractor comprising a shank having a tapered end portion, said end portion being provided with a thread of the opposite hand to the screw to be extracted and being longitudinally fluted, and the threads being spaced apart on said end portion to provide a spiral tapering blank surface of substantial widths between the threads.

2. A screw extractor comprising a shank having a tapered end portion, said end portion being provided with a thread of the opposite hand to the screw to be extracted and being longitudinally fluted, and the bases of the threads being spaced apart by blank surfaces of substantial width, the sectional height of the threads being a minor fraction of the lead.

3. A screw extractor comprising a shank having a tapered end portion, said end portion being provided with a thread of the opposite hand to the screw to be extracted and being longitudinally fluted, each thread being spaced from its adjacent threads by a tapering blank surface of substantial width, and the bottoms of the flutes being substantially in said tapering blank surface.

4. A screw extractor comprising a shank having a tapered end portion, said end portion being provided with a thread of the opposite hand to the screw to be extracted and being longitudinally fluted, and the bases of the threads being spaced apart by blank surfaces of a width at least equal to one-half the thread pitch.

5. A screw extractor comprising a shank having a tapered end portion, said end portion being provided with a thread of the opposite hand to the screw to be extracted and being longitudinally fluted, the threads being of wide V-section with their bases spaced apart by blank surfaces of substantial width.

6. A screw extractor comprising a shank having a tapered end portion, said end portion being provided with a thread of the opposite hand to the screw to be extracted and being longitudinally fluted, each thread being spaced from its adjacent threads by a tapering blank surface of substantial width and the apex angle of the thread being substantially a right angle.

In testimony whereof I have hereunto affixed my signature.

ELMER J. BRYANT.